US008246791B2

(12) United States Patent
McGinnis et al.

(10) Patent No.: US 8,246,791 B2
(45) Date of Patent: Aug. 21, 2012

(54) MULTI-STAGE COLUMN DISTILLATION (MSCD) METHOD FOR OSMOTIC SOLUTE RECOVERY

(75) Inventors: Robert L. McGinnis, Cambridge, MA (US); Menachem Elimelech, Woodbridge, CT (US)

(73) Assignee: Yale University, New Haven, CT (US)

( * ) Notice: Subject to any disclaimer, the term of this patent is extended or adjusted under 35 U.S.C. 154(b) by 774 days.

(21) Appl. No.: 12/308,041

(22) PCT Filed: Jun. 7, 2007

(86) PCT No.: PCT/US2007/013463
§ 371 (c)(1),
(2), (4) Date: Dec. 5, 2008

(87) PCT Pub. No.: WO2007/146094
PCT Pub. Date: Dec. 21, 2007

(65) Prior Publication Data
US 2009/0297431 A1 Dec. 3, 2009

Related U.S. Application Data

(60) Provisional application No. 60/812,383, filed on Jun. 8, 2006.

(51) Int. Cl.
*B01D 3/00* (2006.01)
*B01D 53/22* (2006.01)
*C01C 1/00* (2006.01)
*C02F 1/04* (2006.01)

(52) U.S. Cl. ......... 203/25; 203/74; 203/81; 203/DIG. 8; 203/DIG. 9; 203/DIG. 17; 202/153; 202/154; 202/155; 202/156; 202/172; 202/173; 202/182; 210/644; 210/649; 210/774; 210/805; 210/806; 423/220; 423/237; 423/352

(58) Field of Classification Search .......... 202/153–156, 202/172, 173, 182; 203/10, 25, 27, 74, 81, 203/DIG. 8, DIG. 9, DIG. 17; 210/644, 649, 210/774, 805, 806; 423/220, 237, 352; 159/46, 159/DIG. 27, DIG. 28
See application file for complete search history.

(56) References Cited

U.S. PATENT DOCUMENTS
4,111,759 A 9/1978 Didycz et al.
(Continued)

FOREIGN PATENT DOCUMENTS
EP 1452219 A1 9/2004

OTHER PUBLICATIONS

Supplementary European Search Report in EP 07795870, dated Nov. 26, 2010.
(Continued)

*Primary Examiner* — Virginia Manoharan
(74) *Attorney, Agent, or Firm* — Alan W. Steele; Foley Hoag LLP

(57) ABSTRACT

A method and apparatus for separating draw solution solutes and product solvent from a draw solution using a plurality of distillation columns is disclosed. In one embodiment, the draw solution is used in a Forward Osmosis (FO) water desalination process. In this embodiment, the draw solution is directed to the plurality of distillation columns in parallel while the energy stream (heat) is directed to the plurality of distillation columns in series such that the efficiency of heat use is improved and in turn the cost of the heat is reduced.

22 Claims, 5 Drawing Sheets

U.S. PATENT DOCUMENTS

| | | | | |
|---|---|---|---|---|
| 4,539,076 A * | 9/1985 | Swain | | 202/154 |
| 5,124,004 A * | 6/1992 | Grethlein et al. | | 203/19 |
| 5,830,314 A * | 11/1998 | Mattsson | | 159/17.1 |
| 6,391,205 B1 | 5/2002 | McGinnis | | |
| 6,551,466 B1 | 4/2003 | Kresnyak et al. | | |
| 6,998,053 B2 * | 2/2006 | Awerbuch | | 210/652 |
| 7,799,178 B2 * | 9/2010 | Eddington | | 203/10 |
| 7,867,365 B2 * | 1/2011 | Brown | | 203/19 |
| 2005/0145568 A1 * | 7/2005 | Mc Ginnis | | 210/639 |
| 2005/0183440 A1 | 8/2005 | Holtzapple et al. | | |
| 2006/0225420 A1 * | 10/2006 | Al-Mayahi et al. | | 60/645 |
| 2009/0099154 A1 * | 4/2009 | Jain et al. | | 514/217 |

OTHER PUBLICATIONS

Al-Sofi, M. et al., "Fuel Allocation in Dual-Purpose Plants" *Desalination* 100: 65-70 (1995).

Avlonitis, S.A. et al., "Energy Consumption and Membrane Replacement Costs for Seawater RO Desalination Plants" *Desalination* 157: 151-158 (2003).

Claudel, B. et al., "A New Model of Gas-Solid Kinetics: The Case of Ammonium Carbamate Formation and Decomposition." *Thermochimica Acta* 126: 129-148 (1988).

European Fertilizer Manufacturers' Association "Production of Urea and Urea Ammonium Nitrate" *Best Available Techniques for Pollution Prevention and Control in the European Fertilizer Industry,* Booklet No. 5 of 8.

Gañán, J. et al. "Influence of the Cooling Circulation Water on the Efficiency of a Thermonuclear Plant" *Applied Thermal Engineering* 25: 485-494 (2005).

McCutcheon, J.R. et al., "A Novel Ammonia-Carbon Dioxide Forward (Direct) Osmosis Desalination Process" *Desalination* 174: 1-11 (2005).

McCutcheon, J.R. et al., "Desalination by Ammonia-Carbon-Dioxide Forward Osmosis: Influence of Draw and Feed Solution Concentrations on Process Performance" *Journal of Membrane Science* 278: 114-123 (2006).

McGinnis, R.L. et al., "Energy Requirements of Ammonia-Carbon Dioxide Forward Osmosis Desalination" *Desalination* 207: 370-382 (2007).

Morin, O.J. "Design and Operating Comparison of MSF and MED Systems" *Desalination* 93: 69-109 (1993).

International Search Report for PCT/US07/013463 mailed Nov. 29, 2007.

Office Action from corresponding Japanese patent application No. 2009-514384 dated May 10, 2011.

* cited by examiner

MULTI-STAGE COLUMN DISTILLATION (MSCD) METHOD FOR OSMOTIC SOLUTE RECOVERY

CROSS REFERENCE TO RELATED APPLICATIONS

This application is a National Stage of International Application No. PCT/US2007/013463, filed Jun. 7, 2007, which claims the benefit of U.S. provisional application Ser. No. 60/812,383, filed Jun. 8, 2006, the subject matter of which is incorporated by reference in its entirety.

STATEMENT REGARDING FEDERALLY SPONSORED RESEARCH OR DEVELOPMENT

This invention was partially made with U.S. Government support from the Office of Naval Research, Award No. N000140510801. Accordingly, the U.S. Government may have certain rights in this invention.

FIELD OF THE INVENTION

The invention relates generally to the field of separating solutes and solvents using a plurality of distillation columns. More particularly, the invention relates to seawater desalination, brackish water desalination, wastewater purification, contaminated water remediation, Osmotic Heat Engines (OHE), or any other application where it is desirable to separate solutes and water in an aqueous solution.

BACKGROUND OF THE INVENTION

Seawater and brackish water desalination technologies hold great promise to alleviate water scarcity in arid and densely populated regions of the world. Increasing population growth and a warming global climate have created ever greater disparities between the supplies of, and demands for, reliable fresh water sources. In several cases, conflicts over shared water resources have exacerbated already significant tensions between neighboring states.

Even in areas with sufficient water supplies, inconsistent and often poor water quality contributes to disease and suffering that would be much less prevalent were adequate water treatment more widely available. The need to alleviate water scarcity and ensure good water quality will be a major challenge for scientists and engineers in the coming century. Much work has been done to improve existing water treatment technologies, particularly with regard to increasing the effectiveness and lowering the cost of membrane treatment methods. In a membrane treatment method, a semi-permeable membrane, like the cell wall of a bladder, is used that is selective about what it allows through, generally allowing small molecules (such as water) to pass easily but preventing the passage of many other compounds. With the presence of two solutions, each containing a different concentration of dissolved compounds on either side of the barrier, water will typically move from the side of the more dilute solution to the more concentrated solution. Eventually, osmotic pressure will counter the diffusion process exactly, and equilibrium will form.

One membrane treatment method is known as Reverse Osmosis (RO) which is well understood by one of skill in the art of desalination. The process of RO forces a net flow of water molecules from an aqueous solution with a greater concentration of compounds present within it through a semi-permeable membrane and into a solution with a lower concentration of dissolved compounds. High water pressure on the source side is used to "reverse" the natural or forward osmotic process.

Although progress has been made in lowering the energy requirements and, thus, the cost of RO, challenges remain to be overcome. The energy costs of seawater and brackish water RO are still too high for economic widespread use; large brine discharge streams continue to cause concern over the environmental impacts they may cause; and long term equipment replacement costs remain significant.

In an effort to address some of the challenges still facing current seawater and brackish water desalination technologies, methods of ammonia-carbon dioxide forward osmosis (FO) desalination have been developed. FO processes are described, for example, in U.S. Pat. No. 6,391,205 and U.S. Patent Application Publication No. 2005/0145568, now U.S. Pat. No. 7,560,029, the contents of which are incorporated herein by reference in their entirety. Key advantages of the FO process as compared to RO include lower energy costs, high feedwater recovery, and brine discharge minimization.

In the ammonia-carbon dioxide FO process, a semi-permeable membrane of a type similar to that used in RO is used to separate fresh water from a saline feedwater source. In RO, this separation is driven by a hydraulic pressure gradient across the membrane, generated to a magnitude significantly in excess of the osmotic pressure gradient which resists the flow of fresh water (permeate flow) from the saline feedwater source. The FO process uses the natural tendency of water to flow in the direction of higher osmotic pressure (towards a more concentrated solution), to draw water from the saline feed stream into a highly concentrated "draw solution", effectively separating the fresh water permeate from the saline feedwater stream. A schematic diagram of a prior art ammonia-carbon dioxide FO process is shown in FIG. 1.

The membranes used in the ammonia-carbon dioxide FO process are similar to those used in the RO process. One significant difference lies in the high hydraulic pressures that RO membranes must sustain. This requirement leads to the use of a supporting fabric layer (often up to 100 microns in thickness) within the membrane to increase its strength, an addition which significantly diminishes flux performance when membranes of this type are used in an FO process. FO tests conducted using a membrane specifically manufactured for FO, such that no fabric backing layer was included in its design, demonstrated a flux performance over ten times higher than fabric-backed RO membranes of similar chemistry.

The negative impact on FO performance associated with RO membranes is due to internal concentration polarization (ICP) of the draw solution within the membrane fabric support. In this phenomenon, the permeate penetrating the dense membrane (rejecting layer) dilutes the draw solution within the supporting layer, such that the effective osmotic pressure is greatly diminished at the dense membrane surface. The rate of solute diffusion in the direction of the dense layer is in most cases insufficient to completely counteract the dilution caused by the water flux away from it. This phenomenon may not be counteracted by increasing the tangential flow rate or turbulence of the draw solution, steps normally effective in reducing external concentration polarization, as the ICP phenomenon takes place within the confines of the porous support.

While the elimination of the fabric layer from the membrane's construction improves FO flux significantly, the effects of ICP are not completely resolved by this modification. Some effects remain within the non-fabric porous polymer support integral to asymmetric or thin film composite membrane structures. This porous layer, approximately 50 microns in thickness, underlies the dense membrane layer where solute rejection occurs. The dense layer, often only several microns thick, must be reinforced by this supporting structure in order to sustain handling and fluid shear forces which would otherwise tear the membrane surface. This results in continued reduction in effective osmotic pressure relative to that which would be realized if a dense separating membrane were used alone.

The reduction in effective osmotic pressure due to ICP may be expressed in terms of a "membrane performance ratio" (Pm), defined as the ratio of experimental, or measured flux ($J_{exp}$), to theoretical flux calculated from the osmotic pressure difference between the feed and draw solutions ($J_{thr}$):

$$P_m = \frac{J_{exp}}{J_{thr}}$$

The membrane performance ratio in FO can be quite low, in some cases as little as 2-3%, even when using a membrane designed specifically for FO. The inefficiencies of low membrane performance ratios are not limiting to FO process operation, however, so long as sufficiently high draw solution concentrations are employed. It has been demonstrated that membrane flux could be established equivalent to, or in excess of, that typical of RO, and that seawater recoveries of up to 75% were achievable, based on effective separation of water from a 2 molar NaCl feed stream.

For effective FO desalination, the draw solution must have a high osmotic pressure and contain solutes which are simple and economic to remove and reuse. In the ammonia-carbon dioxide FO process, the draw solution is composed of ammonium salts formed from the mixture of ammonia and carbon dioxide gases in an aqueous solution. The salt species formed include ammonium bicarbonate, ammonium carbonate, and ammonium carbamate. Of these, ammonium carbamate is by far the most soluble. Other draw solutions may utilize ethanol and other thermally removable draw solutes.

One important characteristic of ammonia-carbon dioxide draw solutions is the ratio of ammonia to carbon dioxide in the ammonium salts. The higher the ratio of ammonia to carbon dioxide in the draw solution, the higher the concentration of ammonium carbamate relative to other dissolved species. This allows for a higher concentration of total ammonium salts, leading to a higher osmotic pressure within the solution. The maximum solubility of ammonium bicarbonate at room temperature, for instance, is about 2 molar, but addition of ammonia to such a solution favors the formation of ammonium carbamate (and to a much lesser extent, ammonium carbonate), which allows further carbon dioxide to be added, and so on, allowing high total concentrations of ammonium salts to be dissolved. Elevation in solution temperature also leads to some elevation in solute solubility, but the primary mechanism responsible for high draw solution concentrations is the ratio of the gases that form the salts. The generation of high osmotic pressures in turn allows for the generation of both high water fluxes and high feedwater recoveries in the FO desalination process.

Once the osmotic pressure gradient created by the FO process causes fresh water to flow across the membrane from the saline water feed into the draw solution, the diluted draw solution must be treated for the separation of the ammonium salts. This separation process (also referred to as the recovery process) is based on the thermal decomposition of ammonium bicarbonate, carbonate and carbamate salts into ammonia and carbon dioxide gases that occurs when a solution containing these solutes is heated at an appropriate temperature and pressure. At atmospheric pressure, this decomposition occurs at about 60° C. At lower pressures, the decomposition temperature decreases proportionally. This heating, decomposition, and the stripping and recycling of the ammonia and carbon dioxide gases may be accomplished in a single or in multiple distillation columns, producing as its products fresh water and re-concentrated draw solution for reuse in the FO membrane system. The product water from this process may be specified to contain significantly less than 1 ppm ammonia and carbon dioxide, as is appropriate for potable use.

A simple and proven approach to the removal and recycling of draw solutes from the dilute FO draw solution is the use of a distillation column, which is also known as a reboiler absorption column, or stripper. This approach is now employed, for example, in the stripping of various volatile solutes from wastewaters and process streams, and for the recycling of ammonium carbamate as ammonia and carbon dioxide gases in the production of urea. Depending on the temperature of the heat to be used in the recovery system, one or several distillation columns may be used.

A simple and low energy cost approach to solute recovery in the FO process is the use of a single vacuum distillation column. A schematic of a typical prior art single vacuum distillation column is shown in FIG. 2. This configuration is especially useful when the source of thermal energy is at low temperatures, from about 40 to about 44° C. As shown in FIG. 2, heat at temperatures as low as 40° C. is introduced to a heat transfer means, here, the exterior of the heat exchange surface of reboiler (1) to induce water vapor to rise in a distillation column (a) as the dilute draw solution (introduced at the top of the column) (2) cascades downward in counter-current flow. The transfer of energy from the rising vapor to the falling liquid causes fractional separation of the more volatile ammonia and carbon dioxide from the less volatile water, such that higher in the column there is a higher fraction of ammonia and carbon dioxide than at points lower in the column. At steady state operation, the product water (3) exiting the bottom of the column may be specified to contain less than 1 ppm of ammonia and carbon dioxide. The recovered/separated solutes are introduced back into the concentrated draw solution through an outlet (4) of the distillation column (a). The energy required for this approach is almost entirely thermal, with a small amount of additional electrical power used for fluid pumping to and from the column.

As noted previously, key advantages of the FO process include lower energy costs, high feedwater recovery, and brine discharge minimization. The inventors of the present invention have determined that the cost for the thermal energy required in a FO desalination process may be lowered even further if the efficiency of heat use is improved. The inventors have further determined that this may be accomplished by using higher temperature heat sources in conjunction with a plurality of distillation columns. This approach improves the efficiency of heat use and cuts the energy use of the recovery process (separation of draw solution solutes and product water from the draw solution) by over 70% relative to the use of a single distillation column.

SUMMARY OF THE INVENTION

It is an object of the present invention to separate draw solution solutes and solvent using a plurality of distillation columns. For example, it is an object of the present invention to provide improved arrangements and processes for seawater desalination, brackish water desalination, wastewater purification and contaminated water remediation.

It is another object of the present invention to improve the heat efficiency of a FO desalination process using a plurality of distillation columns.

It is a further object of the present invention to produce maximum product solvent output for a fixed quantity of heat.

The invention accordingly comprises the features of construction, combination of elements, arrangement of parts and sequence of steps which will be exemplified in the construction, illustration and description hereinafter set forth, and the scope of the invention will be indicated by the claims.

To that end, the present invention, generally speaking and in accordance with a first embodiment, is directed to an apparatus comprising:

a first distillation column comprising:
  a first inlet coupled to a source of draw solution for introducing the draw solution into a first end of the first distillation column;
  a first heat transfer means coupled to the first distillation column at a second end, said first heat transfer means having an inlet coupled to a source of thermal energy and an outlet coupled to the first distillation column for introducing thermal energy to the first distillation column to cause at least a portion of the draw solution in the first distillation column to vaporize;
  a first outlet for removing the vaporized portion of the draw solution from the first distillation column; and
at least a second distillation column comprising:
  a first inlet coupled to the source of draw solution for introducing the draw solution into a first end of the second distillation column;
  a second heat transfer means coupled to the second distillation column at a second end, said second heat transfer means having an inlet coupled to the first outlet of the first distillation column for providing a source of thermal energy for the second distillation column and an outlet coupled to the second distillation column for introducing thermal energy to the second distillation column to cause at least a portion of the draw solution in the second distillation chamber to vaporize.

It is another object of this invention to provide a method for separating draw solution solutes and product solvent from a draw solution in a FO desalination process such that the efficiency of heat use is improved.

To that end, and again generally speaking, the present invention, in another preferred embodiment, is also directed to a method comprising the steps of:
  introducing draw solution to each of at least a first distillation column and at least a second distillation column;
  applying thermal energy from a source of thermal energy to a first heat transfer means of the first distillation column to vaporize at least a portion of the draw solution in the first distillation column;
  directing the vaporized portion of the draw solution from the first distillation column to a second heat transfer means of the second distillation column such that the vaporized portion of the draw solution from the first distillation column acts as a source of thermal energy for the second distillation column to vaporize at least a portion of the draw solution in the second distillation column;
  whereby the draw solution solutes and product solvent contained in the draw solution in the at least first and second distillation columns are separated.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

For a fuller understanding of the invention, reference is had to the following description taken in connection with the accompanying figures, in which.

Also, while not all elements are labeled in each figure, all elements with the same reference number indicate similar or identical parts.

DESCRIPTION OF THE PREFERRED EMBODIMENTS

Figure 1:
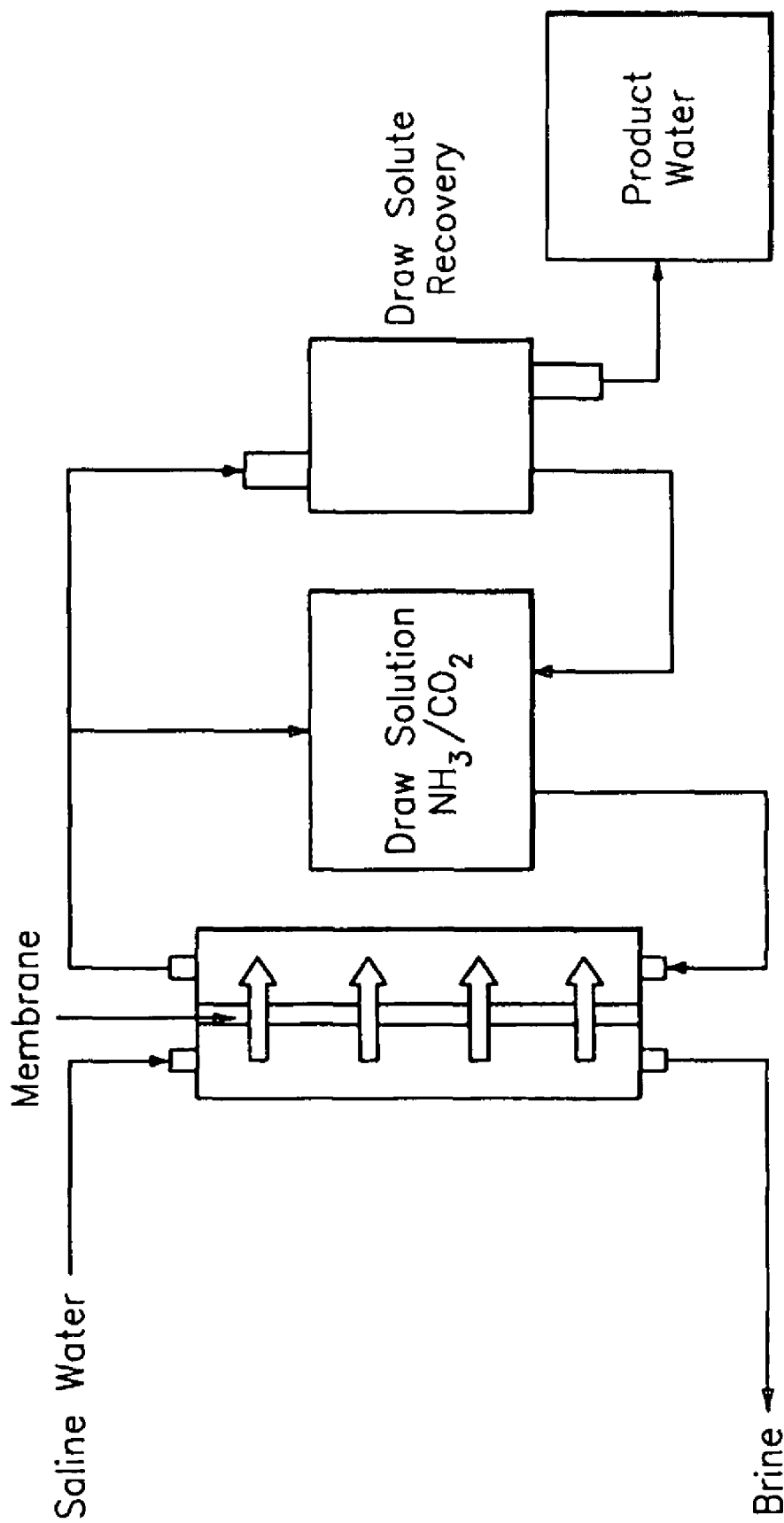
FIG. 1 is a schematic diagram of an ammonia-carbon dioxide FO desalination process in accordance with the prior art.
Figure 2:
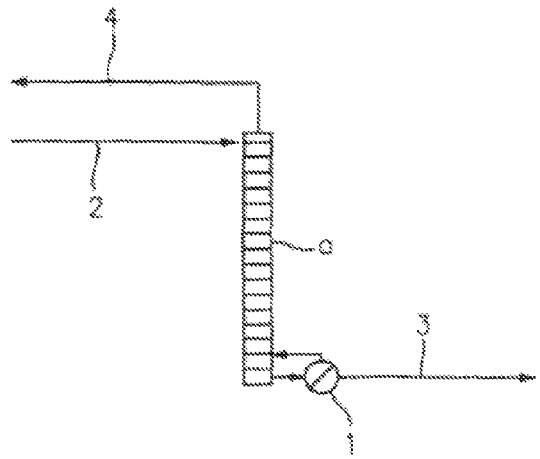
FIG. 2 is a schematic of a single vacuum distillation column also in accordance with the prior art.

The inventors have discovered that there are benefits of the use of multiple distillation columns for the separation/recovery of draw solution solutes and product solvent from the draw solution especially when higher temperature heat sources are available at costs which favor their use, or a primary design criterion is maximum water output for a fixed quantity of heat.

The configuration of the distillation columns in the present invention follows a principle similar to that used in multi stage flash (MSF) and multi effect distillation (MED) thermal desalination processes; processes which are well understood by one skilled in the art. In the MSF and MED processes, both energy and material streams move in series through stages of decreasing pressure, these stages being "flash" or evaporation chambers of various designs. In MSF/MED processes, heat is introduced to a "top" stage of a single distillation column to vaporize a portion of the feedwater and the vapor thus produced is condensed on a heat transfer surface in contact with a second stage (at lower temperature and pressure), causing the vaporization of additional feedwater and so on. This process is carried out repeatedly, with the number of stages dictated by the range in temperature between the top and bottom stages, and the temperature difference between each stage. The higher the number of stages, the greater the energy efficiency realized by the design. In the MSF and MED processes, both energy and material streams move in series through stages of decreasing pressure, these stages being "flash" or evaporation chambers of various designs.

The present invention replaces the single distillation column means of solute removal in FO with a plurality of distillation columns, realizing efficiency gains similar to those of MSF/MED over a single flash chamber. In one embodiment, the present invention is directed to an apparatus for separating draw solution solutes and product solvent from a draw solution, wherein the apparatus comprises:

a first distillation column comprising:
a first inlet coupled to a source of the draw solution for introducing the draw solution into a first end of the first distillation column;
a first heat transfer means coupled to the first distillation column at a second end, said first heat transfer means having an inlet coupled to a source of thermal energy and an outlet coupled to the first distillation column for introducing thermal energy to the first distillation column to cause at least a portion of the draw solution in the first distillation column to vaporize;
a first outlet for removing the vaporized portion of the draw solution from the first distillation column; and
at least a second distillation column comprising:
a first inlet coupled to the source of the draw solution for introducing the draw solution into a first end of the second distillation chamber;
a second heat transfer means coupled to the second distillation column at a second end, said second heat transfer means having an inlet coupled to the first outlet of the first distillation column for providing a source of thermal energy for the second distillation column and an outlet coupled to the second distillation column for introducing thermal energy to the second distillation column to cause at least a portion of the draw solution in the second distillation chamber to vaporize.

Figure 3:
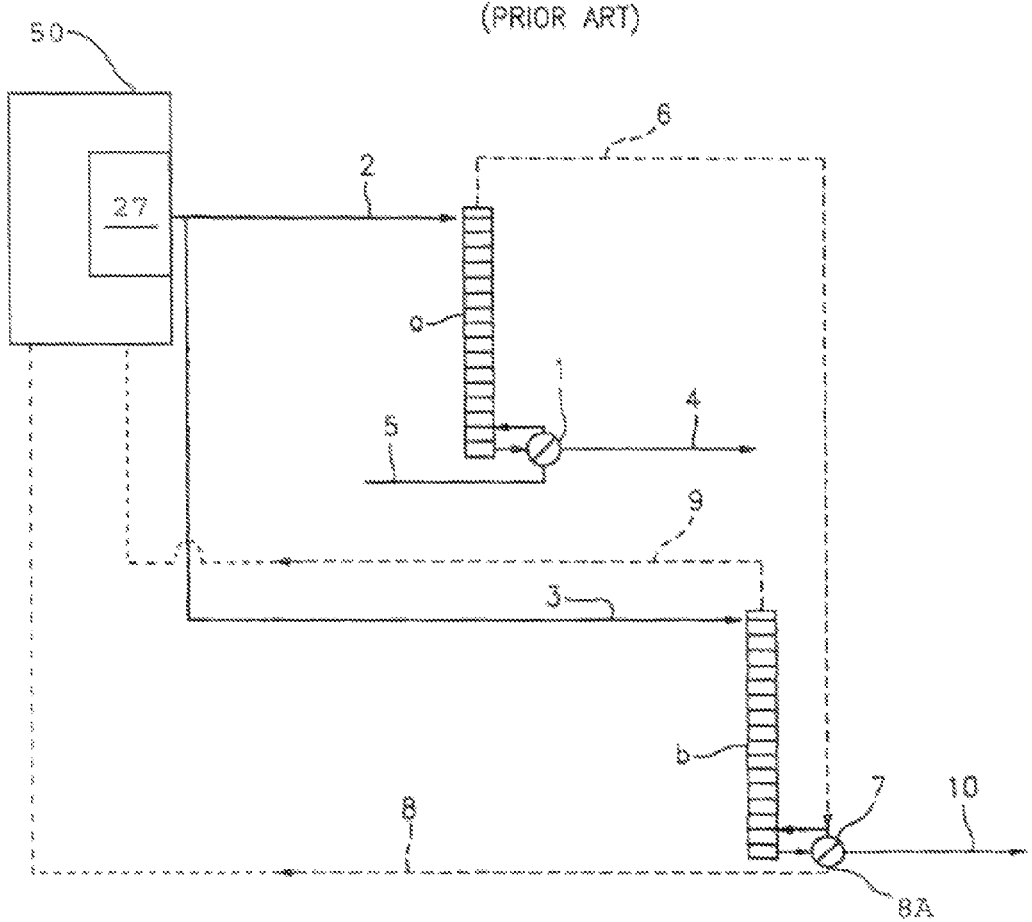
FIG. 3 is a schematic of one embodiment of the present invention.

The various elements of the apparatus are set forth in FIG. 3 that depicts a first distillation column (a) and a second distillation column (b). Each distillation column is coupled to a dilute draw solution stream (2), (3), that is coupled to a source of dilute draw solution (27) from the osmotically driven membrane system (50) or front end of the FO process. The draw solution stream is portioned from the source of the dilute draw solution and is introduced in parallel to each of the two distillation columns (a) and (b). Thermal or heat energy from an outside source (5) is applied to distillation column (a) at a heat transfer means, here, the exterior heat exchange surface of reboiler (1) thereby transferring latent heat for use as the thermal energy source for distillation column (a). The heat energy vaporizes a portion of the draw solution in distillation column (a), allowing for draw solution solute and product water separation from the draw solution in distillation column (a). The vaporized portion of the draw solution (6) from distillation column (a) is coupled to distillation column (b) at a heat transfer means, here, reboiler (7). This arrangement allows the vaporized portion of the draw solution from distillation column (a) to condense on the exterior heat exchange surface of the reboiler (7) of distillation column (b), thereby transferring latent heat for use as the thermal source of energy for distillation column (b). The thermal/heat energy vaporizes a portion of the draw solution in distillation column (b), allowing for draw solution solute and product water separation from the draw solution in distillation column (b). Thus, the energy is directed to the distillation columns in series. It is noted that the vaporized draw solution (6) used as the thermal source of energy for distillation column (b) and the draw solution introduced into distillation column (b) through inlet (3) are completely separate. The condensed vaporized portion of the draw solution (8) from the reboiler of distillation column (b) is coupled back to the osmotically driven membrane system (50) or front end of the FO process, via outlet (8A), where it is added to the concentrated draw solution. The recovered/separated solutes from the draw solution in distillation column (b) are introduced back into the concentrated draw solution through an outlet (9) of the distillation column (b). Product water is collected from each of distillation column (a) and distillation column (b) through outlets (4) and (10) respectively. The columns are designed so that they differ in the pressure and temperature of their operation, with distillation column (a) having a highest temperature and pressure and distillation column (b) having a temperature and pressure lower than that of distillation column (a).

Figure 4:
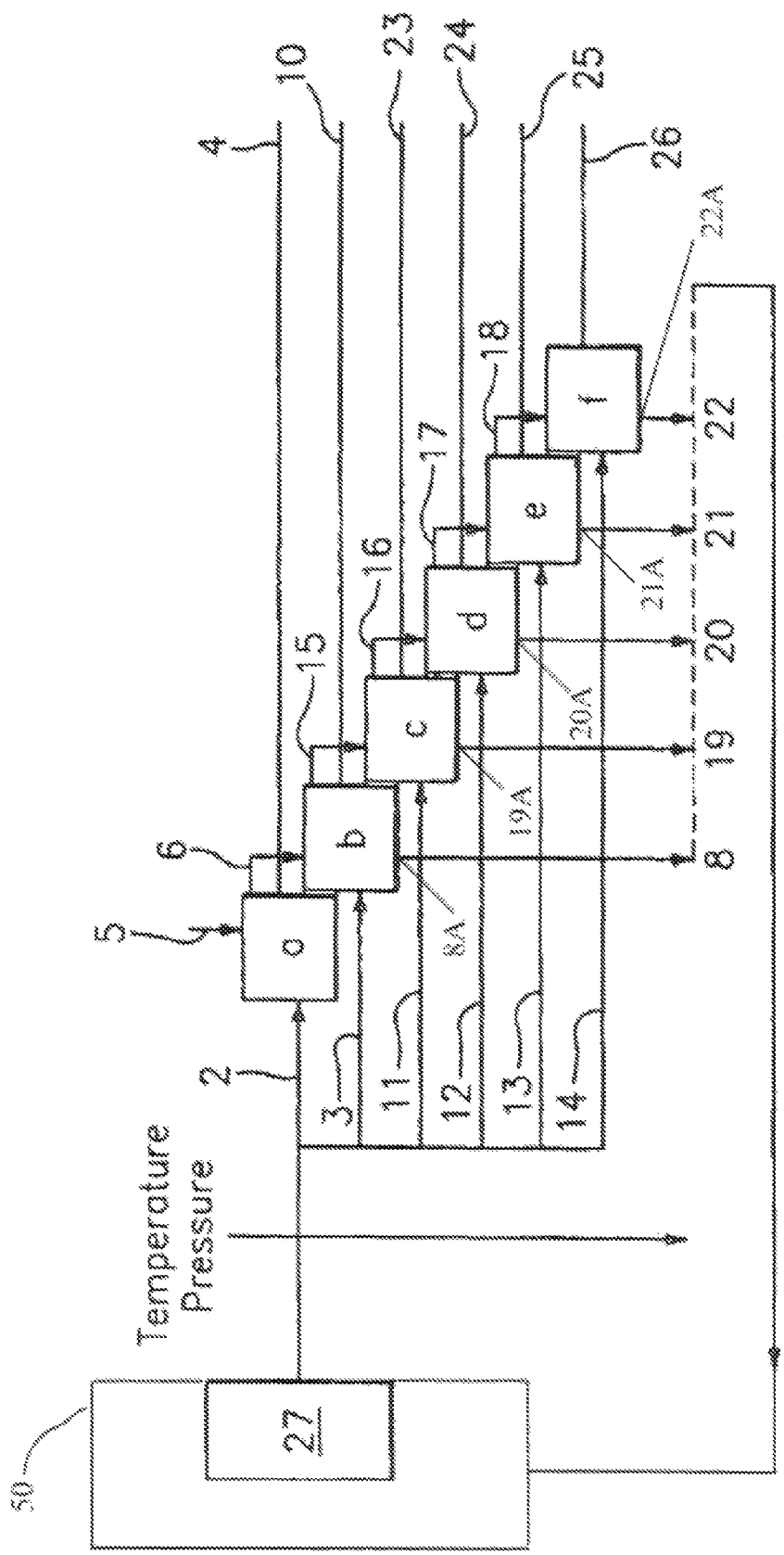
FIG. 4 is a schematic of another embodiment of the present invention.

The apparatus shown in FIG. 3 is exemplary in nature and is not meant to be limiting. The higher the temperature of the heat source available from the outside heat source (also typically known as heat quality) the present invention may utilize more than 2 distillation columns to separate draw solution solutes and product water from the draw solution of a FO process. The specific number of distillation columns will also depend upon the concentration of the draw solution, and the ambient temperature. FIG. 4 is a diagram of such an embodiment of the present invention comprising six distillation columns, (a) through (f). Each column receives and separates the solutes and product water from an independent parallel dilute draw solution stream (2), (3), (11), (12), (13), (14), portioned from the source of the dilute draw solution (27). The columns are designed so that they differ in the temperature and pressure at which they operate, with distillation chamber (a) having the highest temperature and pressure, and each of the remaining columns operating at a temperature and pressure lower than the one before it. It is noted that the pressure at which any given distillation column operates is dependent upon the temperature at which the distillation column operates. It is also noted that the temperature at which any given distillation chamber operates is dependent upon the temperature of the heat energy supplied by the outside heat source and the difference between the temperature of the outside heat source and the ambient temperature. In this arrangement the vaporized portion of the draw solution (5), (6), (15), (16), (17), (18) from distillation columns, (a) through (f) respectively, is coupled to a heat transfer means of the next subsequent distillation column. The vaporized portion of the draw solution condenses on the exterior heat exchange surface of the reboiler of the next subsequent distillation column, thereby transferring latent heat to be used for separation of draw solution solutes (8), (19), (20), (21), (22) and product water (4), (10), (23), (24), (25), (26), from the draw solution in the distillation column. The condensed vaporized portions of the draw solution (8), (19), (20), (21), (22) from the reboiler of distillation column (b) through (f) respectively, are coupled back to the osmotically driven membrane system (50) or front end of the FO process, via outlets (8A), (19A), (20A), (21A), (22A), where it is added to the concentrated draw solution. In this way—directing the material streams in parallel and the energy streams in series—significant gains in efficiency may be realized over the use of a single column alone. FIG. 4 is also exemplary in nature and not meant to be limiting.

Another embodiment of the present invention provides a method for separating draw solution solutes and product solvent from a draw solution, comprising the steps of:
introducing draw solution to each of at least a first distillation column and at least a second distillation column;
applying thermal energy from a source of thermal energy to a first heat transfer means of the first distillation column to vaporize at least a portion of the draw solution in the first distillation column;

directing the vaporized portion of the draw solution from the first distillation column to a second heat transfer means of the second distillation column such that the vaporized portion of the draw solution from the first distillation column acts as a source of thermal energy for the second distillation column to vaporize at least a portion of the draw solution in the second distillation column;

whereby the draw solution solutes and product solvent contained in the draw solution in the at least first and second distillation columns are separated.

Another embodiment of the present invention provides a method for separating draw solution solutes and product solvent from a draw solution, comprising the steps of:

introducing draw solution to each of at least a first distillation column, at least a second distillation column and at least a third distillation column;

applying thermal energy from a source of thermal energy to a first heat transfer means of the first distillation column to vaporize at least a portion of the draw solution in the first distillation column;

directing the vaporized portion of the draw solution from the first distillation column to a second heat transfer means of the second distillation column such that the vaporized portion of the draw solution from the first distillation column acts as a source of thermal energy for the second distillation column to vaporize at least a portion of the draw solution in the second distillation column;

directing the vaporized portion of the draw solution from the second distillation column to a third heat transfer means of the third distillation column such that the vaporized portion of the draw solution from the second distillation chamber acts as a source of thermal energy for the third distillation chamber to vaporize at least a portion of the draw solution in the third distillation column;

whereby the draw solution solutes and product solvent contained in the draw solution in the at least first, second and third distillation columns are separated.

In a preferred embodiment, the draw solution is introduced in parallel to each of the distillation columns as described herein. In other words, the draw solution is introduced to each of the distillation columns from a single source which, as discussed above, is typically a source of dilute draw solution from the membrane system or front end of the FO process. Put another way, the draw solution from the draw solution source is not introduced serially into each of the distillation columns discussed above. Further, the vaporized draw solution used as a source of thermal energy for each subsequent distillation column is separate from the draw solution introduced into each distillation column from the source of dilute draw solution and remains so throughout the process. In some embodiments, the source of thermal energy supplies heat at a temperature of at least about 50° C., and in other embodiments, the source of thermal energy supplies heat at a temperature from about 90° C. to about 250° C.

The number of distillation columns used to separate draw solution solutes and product water from the draw solution in the FO process of the invention is determined by the range of temperature between the first (i.e., outside thermal energy source) and last distillation column (i.e., ambient temperature), and the temperature difference between each of the distillation columns. This can be determined by modeling the energy requirements of the recovery/separation system of the FO process using commercial chemical process modeling software (Hysys, Cambridge, Mass.), operated in conjunction with an electrolyte property package designed to simulate electrolyte solutions of high concentrations and species complexity (OLI, Morris Plains, N.J.). It is noted that the use of this commercially available software in this context is understood by one of skill in the art.

In the modeling cases examined, the operating basis was the production of fresh potable water, recovered from 0.5 molar seawater, at a recovery rate of 75%. The concentrated draw solution contained 5 moles/liter of ammonium salts (on a $CO_2$ basis), with a ratio of ammonia to carbon dioxide of 1.4. The quantity of concentrated draw solution used was varied to produce different concentrations of diluted draw solution between 0.5 and 1.5 molar, as would result from product water dilution of the draw solution in the FO membrane front end. These dilute draw solution streams were directed as feeds to the multiple distillation columns. The seawater (or ambient) temperature was assumed to be 20° C. The FO membrane process operating temperature was specified at 25° C. Process pumping requirements (i.e., electrical energy) were calculated based on typical pressure drops expected for heat exchangers, piping, valves, distillation column stages, and other process equipment.

The distillation columns were specified to contain Goodloe® structured packing (available from Koch-Otto York) with a void fraction of 0.945, a specific area of 580 $ft^2/ft^3$, a static holdup of 5%, and a pressure drop of 15 mm Hg/ft. Packing height was about 7.7 ft.

Thermal and electrical energy requirements were calculated by the modeling software, based on a product water quality specified to contain less than 1 ppm of ammonia. It was assumed that steam was the heat source for the column reboiler, and that condensate would be returned to the steam source. The minimum temperature approach in all heat exchangers was set to 2.5-3.0° C., slightly higher than those typical of thermal desalination methods.

Table 1 provides examples, indicating for a given temperature and minimum steam pressure of the outside thermal/heat energy source, concentration of the draw solution and an ambient temperature of 20° C., the optimum number of distillation columns for use in the separation of draw solution solutes and product solvent in accordance with the present invention.

TABLE 1

| Temperature of Outside Source of Thermal Energy (i.e., steam) (° C.) | Minimum Steam Pressure (psia) | Draw Solution Concentration (M) | Number of distillation columns |
|---|---|---|---|
| 40 | 1.07 | 1 | 1 |
| 40 | 1.07 | 1.5 | 1 |
| 44 | 1.32 | .5 | 1 |
| 70 | 4.53 | 1 | 2 |
| 100 | 14.70 | 1 | 3 |
| 130 | 39.20 | 1 | 4 |
| 160 | 89.67 | .5 | 5 |
| 160 | 89.67 | 1 | 5 |
| 160 | 89.67 | 1.5 | 5 |
| 190 | 182.05 | 1 | 6 |
| 250 | 576.70 | 1 | 8 |

Table 1 is meant to be exemplary and not limiting. For example, it is contemplated that at low ambient temperature, two distillation columns may be used with an outside thermal/heat energy source at a temperature of 50° C. It is further contemplated that draw solution concentrations of up to 6.0 molar can be used with the present invention. Furthermore, given a high enough temperature of the outside thermal/heat energy source and a sufficiently high efficiency target, up to at least about 15 distillation columns may be used in the practice of the present invention.

Figure 5:
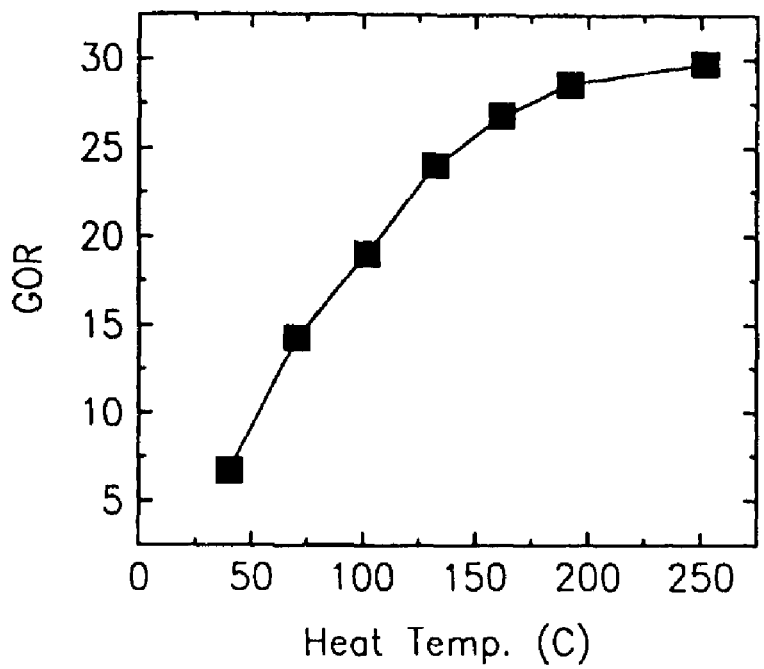
FIG. 5 is a graphic representation of the relationship between the temperature of the heat supplied to the FO recovery/separation process and the quantity of that energy required to separate draw solution solutes and product solvent from the draw solution—GOR. GOR is a frequently used measure of the efficiency of thermal desalination systems, with higher GOR values indicating higher thermal efficiency.

In modeling the energy requirements of the present invention, the inventors have also considered the relationship between the temperature (also typically described as "quality") of the heat supplied to the FO recovery/separation system and the quantity of that energy required to separate draw solution solutes and product water from the draw solution. The unit of this relationship is in terms of gained output ratio (GOR), or the number of kilograms of water produced for each kilogram of steam condensed in the reboiler. This is a frequently used measure of the efficiency of thermal desalination systems, with higher numbers indicating higher efficiency. FIG. 5 is a graphic representation of this relationship. Approximate typical values for MSF and MED are a GOR of between 8 and 15 at temperatures of 70 to 120° C. Table 2 provides the range of GOR values for a FO process using a single distillation column and the range of GOR values for the present invention utilizing a plurality of distillation columns. It is readily apparent that the present invention, with GOR values of between 14.2 and 29.7 for temperatures between 70 to 250° C. has improved efficiency of heat use as compared with current desalination processes. The GOR is impacted by the temperature of the condensate stream returned to the external heat source. The examples provided herein are based on a condensate return stream at the same temperature as the steam provided as the heat energy source (i.e., both energy source (steam) and the water return stream is assumed to be at a temperature 200° C.) If the condensate return stream is returned at a lower temperature than the steam, the GOR increases, particularly at higher temperatures.

TABLE 2

| Temperature of Outside Source of Thermal Energy (i.e., steam) (° C.) | Minimum Steam Pressure (psia) | Draw Solution Concentration (M) | Number of distillation columns | GOR |
|---|---|---|---|---|
| 40 | 1.07 | 1 | 1 | 6.3 |
| 40 | 1.07 | 1.5 | 1 | 4.4 |
| 44 | 1.32 | .5 | 1 | 8.9 |
| 70 | 4.53 | 1 | 2 | 12.6 |
| 100 | 14.70 | 1 | 3 | 16 |
| 130 | 39.20 | 1 | 4 | 19.1 |
| 160 | 89.67 | .5 | 5 | 26.5 |
| 160 | 89.67 | 1 | 5 | 20.2 |
| 160 | 89.67 | 1.5 | 5 | 14.8 |
| 190 | 182.05 | 1 | 6 | 20.3 |
| 250 | 576.70 | 1 | 8 | 18.2 |

The temperature of heat used by the FO process affects not only the quantity required, but also the value and therefore cost of the heat used. An effective method for estimating the value of process heat in thermal desalination systems involves the calculation of "equivalent work". Using this method, thermal energy is assigned an electrical energy value, based on the capacity of that thermal energy to generate electricity in a steam turbine. If it is assumed that the steam used to supply thermal energy to a desalination process is extracted from a steam turbine, one may calculate the work that the steam could have done to generate electricity. This work value may be used for theoretical comparison of thermal process efficiencies, as well as for real-world costing of process steam supplied to a desalination process.

The following formula is used to calculate this equivalent work:

$$W_{equiv} = \frac{kg_{waterproduct}(H_{steamused} - H_{steamatcondenser}) X E_{turbine}}{GOR} 0.000277 \frac{kWh}{kJ} + W_{elec}$$

The enthalpy of the steam at the point where it would normally enter the turbine condenser is subtracted from the enthalpy of the steam at the point where it is extracted and directed to the desalination process. This difference in enthalpy is multiplied by the efficiency of the turbine (in this instance assumed to be 95%) to assign the heat an equivalent work value, in kWh/kg steam. The amount of steam required to generate a cubic meter of water is given by the thermal process's GOR at that steam temperature. The result is multiplied by 1000 kg. of water to give a specific heat duty in terms of $m^3$ of water. The condenser temperature is assumed to be 35° C., based on tabular data relating condenser temperature to seawater cooling temperatures. Once the equivalent work value of the steam used by the process is calculated, it is added to any process electrical requirements. This gives a unified value for the total value of energy consumed.

Figure 6:
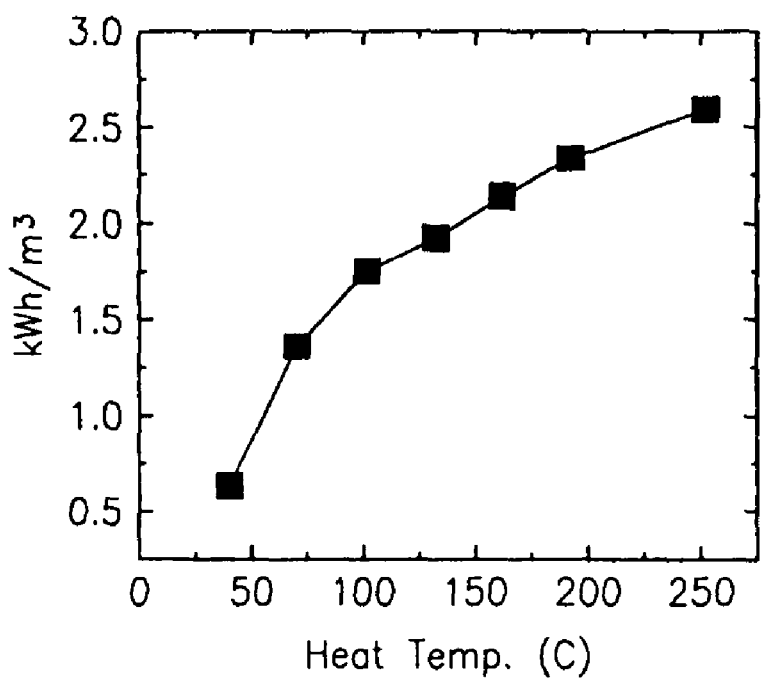
FIG. 6 is a graphic representation of the equivalent work of a FO desalination process.

The calculations of equivalent work, including the components of heat duty and electrical energy, are summarized in Table 3. FIG. 6 shows the equivalent work of the FO desalination process based on a 1 M (dilute draw solution) column feed concentration, relative to the quality of heat supplied. As the temperature of the heat used increases, its work value offsets the increased efficiency made possible by the use of multiple distillation columns. The net trend is increased equivalent work. Similarly to GOR, equivalent work is also impacted by the temperature of the condensate stream returned to the external heat source. The examples provided herein are based on a condensate return stream at the same temperature as the steam provided as the heat energy source (i.e., both energy source (steam) and the water return stream is assumed to be at a temperature 200° C.) If the condensate return stream is returned at a lower temperature than the steam, the equivalent work increases, particularly at higher temperatures.

TABLE 3

| Temperature of Outside Source of Thermal Energy (i.e., steam) (° C.) | Minimum Steam Pressure (psia) | Draw Solution Concentration (M) | Number of distillation columns | GOR | Equivalent Work (kWh/$m^3$) | Heat Duty (MJ/$m^3$) | Elec. Duty (kWh/$m^3$) |
|---|---|---|---|---|---|---|---|
| 40 | 1.07 | 1 | 1 | 6.3 | .66 | 382.27 | .22 |
| 40 | 1.07 | 1.5 | 1 | 4.4 | .84 | 541.55 | .24 |
| 44 | 1.32 | .5 | 1 | 8.9 | .73 | 269.13 | .20 |
| 70 | 4.53 | 1 | 2 | 12.6 | 1.50 | 185.38 | .21 |
| 100 | 14.70 | 1 | 3 | 16 | 2.03 | 140.91 | .20 |

TABLE 3-continued

| Temperature of Outside Source of Thermal Energy (i.e., steam) (° C.) | Minimum Steam Pressure (psia) | Draw Solution Concentration (M) | Number of distillation columns | GOR | Equivalent Work (kWh/m³) | Heat Duty (MJ/m³) | Elec. Duty (kWh/m³) |
|---|---|---|---|---|---|---|---|
| 130 | 39.20 | 1 | 4 | 19.1 | 2.36 | 113.53 | .22 |
| 160 | 89.67 | .5 | 5 | 26.5 | 2.14 | 78.62 | .22 |
| 160 | 89.67 | 1 | 5 | 20.2 | 2.77 | 103.04 | .25 |
| 160 | 89.67 | 1.5 | 5 | 14.8 | 3.69 | 140.37 | .26 |
| 190 | 182.05 | 1 | 6 | 20.3 | 3.18 | 97.58 | .30 |
| 250 | 576.70 | 1 | 8 | 18.2 | 3.93 | 94.29 | .50 |

Figure 7:
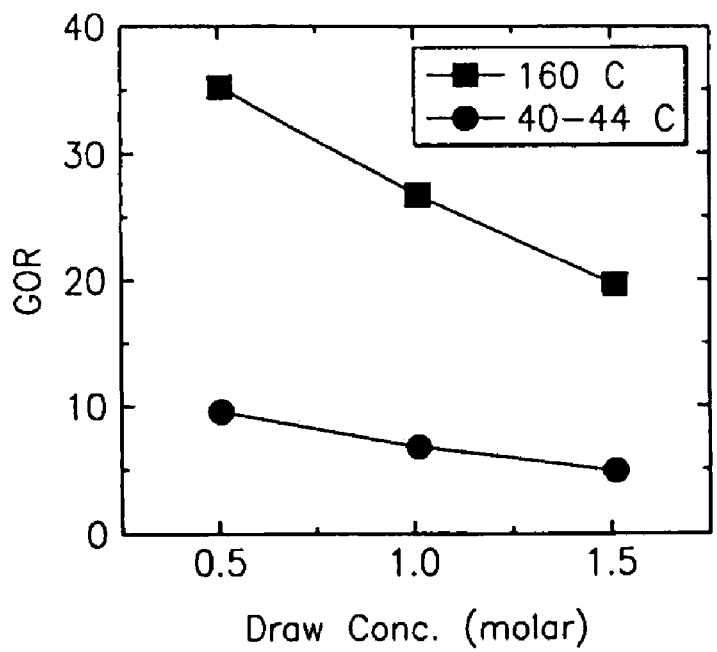
FIG. 7 is a graphic representation of the relationship between dilute draw solution concentration and heat duty as GOR.
Figure 8:
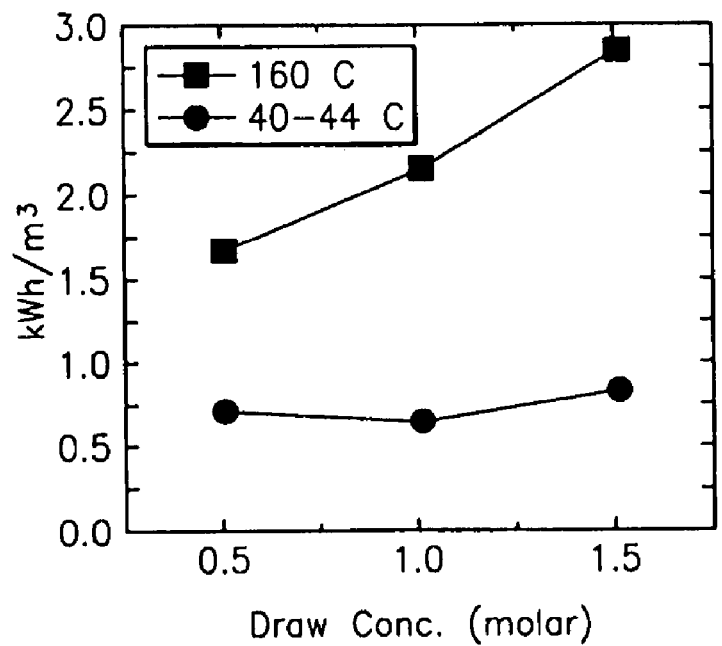
FIG. 8 is a graphic representation of the relationship between dilute draw solution concentration and equivalent work.

There is a direct relationship between the concentration of dilute draw solution entering the solute and product water recovery/separation system and the amount of energy used by the FO desalination process. As discussed earlier, the concentration of draw solution required is directly related to the FO membrane's performance ratio and is therefore directly impacted by membrane design. FIG. 7 shows the relationship between dilute draw solution concentration and heat duty as GOR. FIG. 8 shows the relationship between dilute draw solution concentration and equivalent work. The values shown are for both a Multistage Column Distillation System of the present invention operating at 160° C. and a single vacuum distillation column operating at between 40-44° C. (lowest vacuum column temperature varies with feed concentration).

The use of higher temperature heat sources in the present invention results in significantly increased efficiency for FO relative to current technologies. This is due primarily to the fact that in FO, energy is used to vaporize draw solution solutes, rather than feedwater solvent, as is done in MSF and MED. An additional benefit found in the use of FO process of the present invention is in the low electrical energy consumption of the process. Current processes use between 1.6-3.02 kWh/m³ electrical power, while, as shown in Table 2, FO processes utilizing the present invention requires electrical power of only 0.24 kWh/m³.

While the invention has been particularly shown and described with respect to preferred embodiments thereof, it will be understood by those skilled in the art that changes in forms and details may be made therein without departing from the scope and spirit of the invention. For example, the present invention is as applicable to Osmotic Heat Engines (OHE) as it is to the FO desalination and water treatment processes discussed herein.

What is claimed is:

1. An apparatus for separating draw solution solutes and product solvent from a dilute draw solution, wherein the apparatus comprises:
    an osmotically driven membrane system comprising a source of dilute draw solution comprising thermally removable solutes;
    a first distillation column comprising:
        a first inlet coupled to the source of dilute draw solution for introducing a first portion of the dilute draw solution into a first end of the first distillation column;
        a first heat transfer means coupled to the first distillation column at a second end, said first heat transfer means having an inlet coupled to a first source of thermal energy and an outlet coupled to the first distillation column for directing the first source of thermal energy to the first distillation column to cause at least a portion of the dilute draw solution solutes in the first distillation column to vaporize; and
        a first outlet for removing the vaporized dilute draw solution solutes from the first distillation column; and
    a second distillation column comprising:
        a first inlet coupled to the source of dilute draw solution for introducing a second portion of the dilute draw solution into a first end of the second distillation column, wherein the first distillation column and the second distillation column are configured for parallel operation;
        a second heat transfer means coupled to the second distillation column at a second end, said second heat transfer means having an inlet coupled to the first outlet of the first distillation column for receiving the vaporized dilute draw solution solutes for use as a second source of thermal energy for the second distillation column, a first outlet coupled to the second distillation column for directing the second source of thermal energy to the second distillation column to cause at least a portion of the dilute draw solution solutes in the second distillation column to vaporize, and a second outlet coupled to the osmotically driven membrane system for reintroducing the vaporized dilute draw solution solutes from the first distillation column condensed within the second heat transfer means to the osmotically driven membrane system; and
        a first outlet for removing the vaporized dilute draw solution solutes from the second distillation column.

2. The apparatus as claimed in claim 1, wherein the first outlet of the second distillation column is coupled to the osmotically driven membrane system for reintroducing the vaporized dilute draw solution solutes from the second distillation column to the osmotically driven membrane system.

3. The apparatus as claimed in claim 1, wherein the distillation columns further comprise second outlets for removing solvent from the distillation columns.

4. The apparatus as claimed in claim 1, further comprising:
    a third distillation column comprising:
        a first inlet coupled to the source of dilute draw solution for introducing a third portion of dilute draw solution into a first end of the third distillation column, wherein the third distillation column is configured for parallel operation with the first and second distillation columns;
        a third heat transfer means coupled to the third distillation column at a second end, said third heat transfer means having an inlet coupled to the first outlet of the second distillation column for receiving the vaporized dilute draw solution solutes for use as a third source of thermal energy for the third distillation column, a first outlet coupled to the third distillation column for directing the third source of thermal energy to the third distillation column to cause at least a portion of the dilute draw solution solutes in the third distillation column to vaporize, and a second outlet coupled to the osmotically driven membrane system for reintroducing the vaporized dilute draw solution solutes from the second distillation column condensed within the third heat transfer means to the osmotically driven membrane system; and a first outlet for removing the vaporized draw solution solutes from the third distillation column.

5. The apparatus as claimed in claim 4, wherein the first outlet of the third distillation column is coupled to the osmotically driven membrane system for reintroducing the vaporized dilute draw solution solutes from the third distillation column to the osmotically driven membrane system.

6. The apparatus as claimed in claim 4, wherein the third distillation column further comprises a second outlet for removing solvent from the third distillation column.

7. The apparatus as claimed in claim 1, wherein the first source of thermal energy supplies heat at a temperature of at least 50° C.

8. The apparatus as claimed in claim 7, wherein the first source of thermal energy supplies heat at a temperature from about 90° C. to about 250° C.

9. The apparatus as claimed in claim 1, wherein the osmotically driven membrane system is a forward osmosis desalination system.

10. The apparatus as claimed in claim 1, wherein the dilute draw solution comprises an aqueous solution of ammonium salts formed from a mixture of ammonia and carbon dioxide.

11. The apparatus as claimed in claim 1, wherein the first source of thermal energy is steam.

12. The apparatus as claimed in claim 1, wherein the dilute draw solution has a concentration of at least 0.5 molar.

13. A method of recovering draw solution solutes from an osmotically driven membrane system, wherein the method comprises the steps of:

providing a source of dilute draw solution from the osmotically driven membrane system, wherein the dilute draw solution comprises thermally removable solutes;

introducing a first portion of the dilute draw solution to a first distillation column;

introducing in parallel a second portion of the dilute draw solution to a second distillation column;

introducing a source of thermal energy to a heat transfer means of the first distillation column;

vaporizing at least a portion of the dilute draw solution solutes out of the first portion of the dilute draw solution in the first distillation column;

directing the vaporized dilute draw solution solutes from the first distillation column to a heat transfer means of the second distillation column, wherein the vaporized dilute draw solution solutes from the first distillation column provide a second source of thermal energy for the second distillation column;

vaporizing at least a portion of the dilute draw solution solutes out of the second portion of the dilute draw solution in the second distillation column; and recycling the vaporized draw solution solutes from the first distillation column condensed in the heat transfer means of the second distillation column to the osmotically driven membrane system.

14. The method as claimed in claim 13, wherein the osmotically driven membrane system comprises a forward osmotic desalination system.

15. The method as claimed in claim 13, wherein the step of introducing a source of thermal energy comprises introducing steam.

16. The method as claimed in claim 13, wherein at least one of the first portion or the second portion of the dilute draw solution is introduced at a concentration of about 0.5 molar or greater.

17. The method as claimed in claim 16, wherein the at least one of the first portion or the second portion of the dilute draw solution is introduced at a concentration from about 0.5 molar to about 6.0 molar.

18. The method as claimed in claim 13, wherein the method further comprises the steps of:

introducing in parallel a third portion of the dilute draw solution to at least a third distillation column;

directing the vaporized dilute draw solution solutes from the second distillation column to a heat transfer means of the third distillation column, wherein the vaporized dilute draw solution solutes from the second distillation column provide a third source of thermal energy for the third distillation column;

vaporizing at least a portion of the dilute draw solution solutes out of the third portion of the dilute draw solution in the third distillation column; and recycling the vaporized dilute draw solution solutes from the second distillation column condensed in the heat transfer means of the third distillation column to the osmotically driven membrane system.

19. The method as claimed in claim 13, further comprising the step of recycling the vaporized dilute draw solution solutes from the second distillation column to the osmotically driven membrane system.

20. The method as claimed in claim 13, wherein the step of introducing a source of thermal energy comprises introducing heat at a temperature of at least 50° C.

21. The method as claimed in claim 20, wherein the step of introducing a source of thermal energy comprises introducing heat at a temperature from about 90° C. to about 250° C.

22. The method as claimed in claim 13, further comprising the step of removing solvent from the distillation columns.

* * * * *